United States Patent [19]

Wada et al.

[11] Patent Number: 4,595,516

[45] Date of Patent: Jun. 17, 1986

[54] HEAT STORAGE MATERIAL

[75] Inventors: Takahiro Wada, Katano; Fumiko Yokotani, Ibaraki; Yoshihiro Matsuo, Neyagawa; Hiroshi Yoneno, Nara, all of Japan

[73] Assignee: Matsushita Electric Industrial Co., Ltd., Osaka, Japan

[21] Appl. No.: 677,248

[22] Filed: Dec. 3, 1984

[30] Foreign Application Priority Data

Dec. 5, 1983 [JP] Japan .................. 58-229317
Jun. 21, 1984 [JP] Japan .................. 59-127917

[51] Int. Cl.$^4$ .................................................. C09K 5/06
[52] U.S. Cl. ........................................................ 252/70
[58] Field of Search ........................................... 252/70

[56] References Cited

U.S. PATENT DOCUMENTS 4,189,393 2/1980 Schröder et al. ............... 252/70
4,400,287 8/1983 Kimura et al. ................. 252/70

FOREIGN PATENT DOCUMENTS 55746 11/1982 Japan ............................ 252/70
2001096 1/1979 United Kingdom ........... 252/70

OTHER PUBLICATIONS

Jolicoeur et al., "Concentration Dependence of the Enthalpies of Mixing of Some Aqueous Electrolytes at 25°, Test of Young's Rule", J. Chem. Thermodyn, 1969, 1(5), 485–493 (CA 73: 92313).

Primary Examiner—Paul Lieberman
Assistant Examiner—Robert A. Wax
Attorney, Agent, or Firm—Stevens, Davis, Miller & Mosher

[57] ABSTRACT

A heat storage material comprising a system consisting of sodium acetate and water incorporated with a fluorine ion-containing salt which is in solid state at the crystallizing temperature of sodium acetate trihydrate, as a nucleating agent for sodium acetate trihydrate.

6 Claims, 15 Drawing Figures

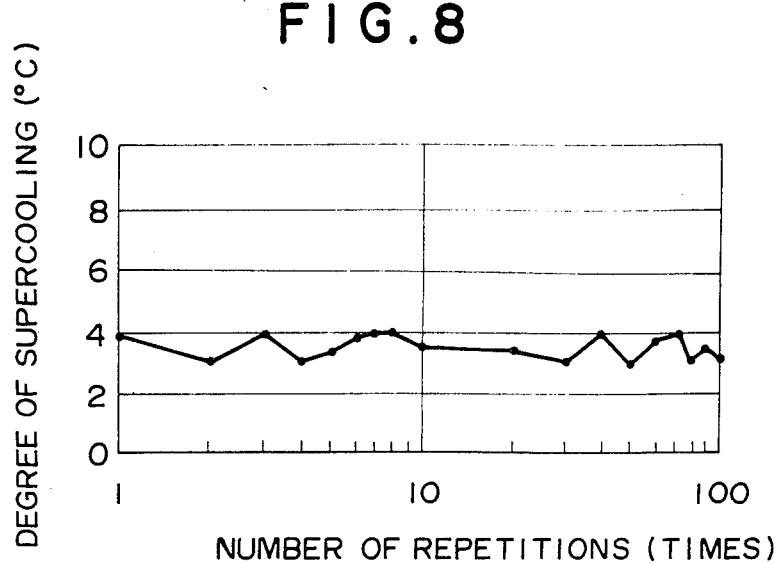
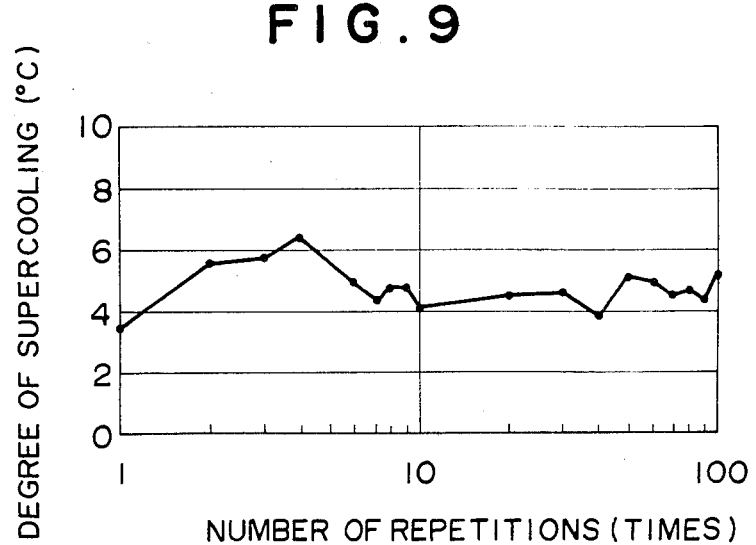

though slowly to approximately 30° C. Accordingly, the $CH_3CO_2Na$ content of $CH_3CO_2Na-H_2O$ system is desirably at most 60.3% by weight.

HEAT STORAGE MATERIAL

TECHNICAL FIELD

The present invention relates to a latent-heat storage material comprising sodium acetate trihydrate as its main constituent.

CONSTITUTION OF PRIOR ART AND PROBLEMS INVOLVED

In general, as heat storage materials, there are known those utilizing sensible heat of substances and those utilizing their latent heat. As compared with the heat storage materials utilizing sensible heat, the heat storage materials utilizing latent heat store a large amount of heat per unit weight or per unit volume, are needed in an only small amount for storing a required amount of heat, and hence make it possible to make a heat storage apparatus in small size. Further, the storage materials utilizing latent heat are characterized in that unlike the storage materials utilizing sensible heat, they do not undergo a lowering of its temperature and heat liberation simultaneously, but liberate heat having a constant temperature at the transition point. In particular, heat storage materials utilizing the latent heat of fusion of inorganic hydrates are known to store a large amount of heat per unit volume [Maria Telkes; Ind. Eng. Chem., Vol. 44, 1308 (1952)].

Sodium acetate trihydrate ($CH_3CO_2Na.3H_2O$, m.p. about 58° C.) has heretofore been considered to be effective as a heat storage material, for example, for heating because it stores a large amount of heat as compared with other inorganic hydrates. However, since $CH_3CO_2Na.3H_2O$ is very liable to be fallen into a super-cooled state when it is melted, the melt cannot, in usual, get out of the super-cooled state unless it is cooled to about $-20°$ $C_1$. Super-cooling cooling is a phenomenon in which a liquid is cooled to below its solidifying point without liberating latent heat of fusion at the solidifying point, and therefore this phenomenon becomes a defect fatal to heat storage materials utilizing latent heat of fusion.

In order to prevent the supercooling phenomenon of sodium acetate trihydrate, addition of various compounds have been proposed [Zlatko Stunic et al.; J. Appln. Chem. Biotechnol. Vol. 28, 761 (1978), Hiroshi Kimura; NIPPON KESSHO SEICHO GAKKAISHI Vo. 7, No. 3 & 4, 215 (1980)]. However, these compounds are poor in stability of effects and hence cannot be put to practical use. Any practical nucleating agent for sodium acetate trihydrate has not yet been found [Katsuhiko Narita and Junjiroh Kai; DENKI GAKKAI ZASSHI Vol. 101, No. 1, pp. 15, (1981)].

BRIEF DESCRIPTION OF THE DRAWINGS

FIGS. 2 to 15 show the mode of change of the degree of supercooling in cases where examples of the heat storage material of the present invention are subjected to alternate heating and cooling repeatedly 100 times.

DISCLOSURE OF THE INVENTION

The present invention aims at providing a heat storage material storing a large amount of heat per unit weight or unit volume which prevents the supercooling phenomenon of sodium acetate trihydrate is inexpensive, has stable heat absorbing and liberating abilities and has a high heat resistance temperature.

PREFERRED EMBODIMENT OF THE INVENTION

The present invention is characterized most markedly in that a system consisting of sodium acetate ($CH_3CO_2Na$) and water is used as the main constituents and incorporated with a fluorine ion-containing salt which is in solid state at the crystallizing temperature of sodium acetate trihydrate, as a nucleating agent for preventing supercooling in crystallization of $CH_3CO_2Na.3H_2O$. The fluorine ion-containing salt which is in solid state at the crystallizing temperature of sodium acetate trihydrate is preferably at least one member selected from the compound group consisting of lithium fluoride, lithium hydrogen fluoride, sodium fluoride, sodium hydrogen fluoride, ammonium fluoride, strontium fluoride, chromium fluoride, manganese fluoride, cobaltous fluoride, cobaltic fluoride, cobalt silicofluoride, lithium silicofluoride, potassium titanofluoride and lithium titanofluoride.

Figure 1:
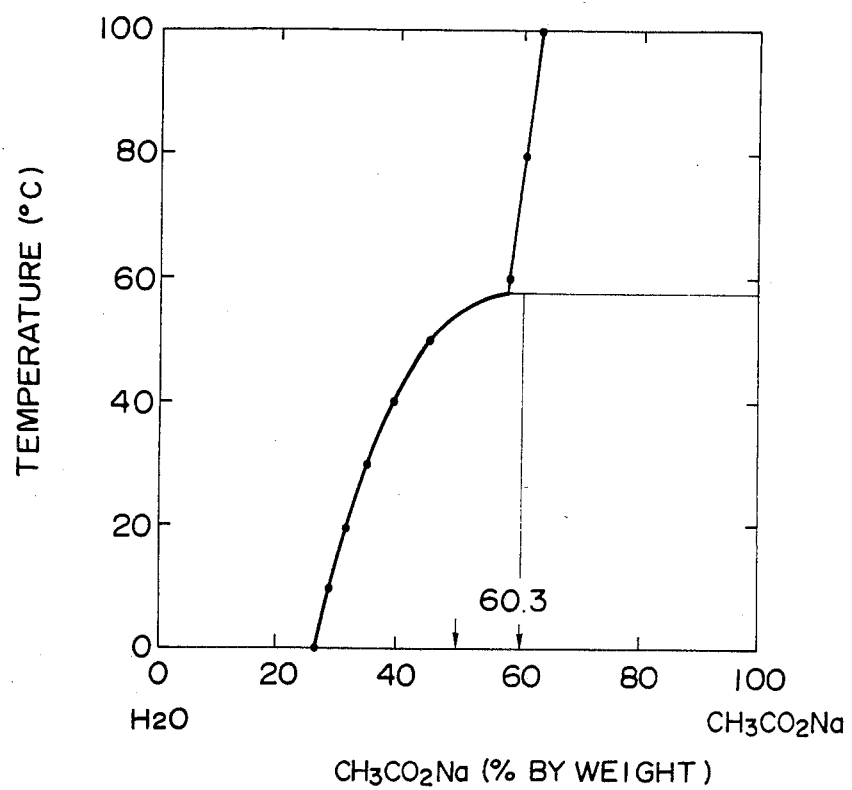
FIG. 1 shows a phase diagram of sodium acetate-water system.

A phase diagram of $CH_3CO_2Na-H_2O$ system is shown in FIG. 1. It can been seen from FIG. 1 that a system consisting of 60.3% by weight of $CH_3CO_2Na$ and 39.7% by weight of $H_2O$ corresponds to $CH_3CO_2Na.3H_2O$ composition, and that in the case of this composition, melting and solidification occur at about 58° C. if no supercooling occurs. A system consisting of 50% by weight $CH_3CO_2Na$ and 50% by weight $H_2O$ becomes a uniform aqueous $CH_3CO_2Na$ solution at a temperature above approximately 55° C. When this uniform aqueous solution is cooled to 55° C. or lower, $CH_3CO_2Na.3H_2O$ begins to crystallize if no supercooling occurs, and the proportion of $CH_3CO_2Na.3H_2O$ crystals increases with the progress of cooling. When the aqueous solution is cooled to approximately 30° C., about 60% of the total weight of the 50% by weight $CH_3CO_2Na-H_2O$ system becomes crystals of $CH_3CO_2Na.3H_2O$ and the balance, 40%, thereof exists as an aqueous $CH_3CO_2Na$ solution. Therefore, when the system consisting of 50% by weight of $CH_3CO_2Na$ and 50% by weight of $H_2O$ is cooled from a temperature above 55° C. to 30° C., latent heat is obtained in an amount (per unit weight) of about 60% of latent heat obtained in the case of $CH_3CO_2Na.3H_2O$ composition, if almost no supercooling occurs and $CH_3CO_2Na.3H_2O$ crystallizes satisfactorily. Needless to say, with an increase of the proportion of water in $CH_3CO_2Na-H_2O$ system, sensible heat of the heat storage material increases and the amount of heat stored due to sensible heat increases. That is to say, the range of application of the heat storage material can greatly be enlarged by conducting heat storage by using latent heat of fusion and sensible heat in combination so as to control the ratio between heat storage using latent heat of fusion and heat storage using sensible heat, by controlling the ratio between $CH_3CO_2Na$ and $H_2O$. However, since employment of a system having too low a $CH_3CO_2Na$ concentration results in loss of characteristics of the heat storage material using latent heat of fusion, it is proper to use a $CH_3CO_2Na-H_2O$ system containing 40% by weight or more $CH_3CO_2Na$.

On the other hand, when the $CH_3CO_2Na$ content of $CH_3CO_2Na-H_2O$ system is increased, $CH_3CO_2Na.3H_2O$ crystallizes as is obvious from FIG. 1 if a system containing 60.3% by weight or more $CH_3CO_2Na$ escapes from supercooling satisfactorily when cooled from a temperature higher than 58° C. to 58° C. or lower. However, needless to say, the system do not wholly becomes $CH_3CO_2Na.3H_2O$ but partly remains as $CH_3CO_2Na$. A $CH_3CO_2Na$-$H_2O$ system containing more than 80% by weight $CH_3CO_2Na$, therefore, has a latent heat in an amount (per unit weight) of only about 50% or less of that of $CH_3CO_2Na.3H_2O$ composition and hence is not practical. Accordingly, it is considered to be proper that a $CH_3CO_2Na$-$H_2O$ system for practical use contains $CH_3CO_2Na$ in an amount in the range of 80% by weight or less.

As to the nucleating agent content, when the concentration of $CH_3CO_2Na$ is 58% by weight or more and the nuclearing agent is at least one member selected from the compound group consisting of lithium fluoride (LiF), lithium hydrogen fluoride ($LiHF_2$), sodium fluoride (NaF), sodium hydrogen fluoride ($NaHF_2$), ammonium fluoride ($NH_4F$), strontium fluoride ($SrF_2$), chronium fluoride ($CrF_3$), manganese fluoride ($MnF_2$), cobaltous fluoride ($CoF_2$), cobaltic fluoride ($CoF_3$), cobalt silicofluoride ($CoSiF_6$), lithium silicofluoride ($Li_2SiF_6$), potassium titanofluoride ($K_2TiF_6$) and lithium titanofluoride ($Li_2TiF_6$), the nucleating agent is sufficiently effective at an amount of about 1.0 parts by weight per 100 parts by weight of a system consisting of $CH_3CO_2Na$ and $H_2O$ and is, of course, effective when contained in a larger amount. In the case of a system containing less than 58% by weight of $CH_3CO_2Na$, in comparison with a system containing 58% by weight or more of $CH_3CO_2Na$, the amount of the nuclearing agent dissolved in the $CH_3CO_2Na$-$H_2O$ system increases, so that the amount of the nucleating agent added should be larger than the above-mentioned value.

However, when the heat storage material according to the present invention is used in a heat storage apparatus for air conditioning or the like, it is considered to be usual to use about 100 to 1,000 kg of the heat storage material. In such a case, the whole system has no uniform composition even in a condition in which $CH_3CO_2Na.3H_2O$ crystals are melted, and a solution of $CH_3CO_2Na$ with a low concentration exists in the upper part, while a precipitate of the nucleating agent and a highly concentrated solution of $CH_3CO_2Na$ and the nucleating agent exist in the lower part. Therefore, even when the amount of the nuclearing agent mixed is far smaller than the minimum amount for forming a uniform solution, the nucleating agent is not dissolved in the $CH_3CO_2Na$-$H_2O$ system but fulfils its function as nucleating agent. The minimum amount of the aforesaid nucleating agent required for nucleation, namely, the lower limit of the amount thereof mixed is dependent on the amount of the $CH_3CO_2Na$-$H_2O$ system to be used and the shape of a container for the heat storage material, and hence may properly be determined depending on modes of employment.

However, addition of too large an amount of the nucleating agent is not preferable for the heat storage material and leads to a decrease of the amount of heat stored in the whole heat storage material. Accordingly, for practical purposes, the mixing proportion of the nucleating agent to the $CH_3CO_2Na$-$H_2O$ system is desired to be less than 40 parts by weight of the former to 100 parts by weight of the latter.

EXAMPLE 1

In a beaker were placed 1,000 g of $CH_3CO_2Na.3H_2O$ and 10 g of each of the nucleating agents shown in Table 1, and heated to 76° C. in a water bath to melt the whole $CH_3CO_2Na.3H_2O$. The mixture thus obtained was placed in a cylindrical container having an inside diameter of 100 mm and a length of 100 mm, which was then sealted up with a plug equipped with a thermocouple-containing tube. The container was placed in a water bath and alterate heating and cooling were continuously repeated between 76° C. and 40° C.

TABLE 1

| No. | Nucleating agent Name | Chemical formula | No. of FIG. |
|---|---|---|---|
| 1 | Lithium fluoride | LiF | 2 |
| 2 | Lithium hydrogen fluoride | $LiHF_2$ | 3 |
| 3 | Sodium fluoride | NaF | 4 |
| 4 | Sodium hydrogen fluoride | $NaHF_2$ | 5 |
| 5 | Ammonium fluoride | $NH_4F$ | 6 |
| 6 | Strontium fluoride | $SrF_2$ | 7 |
| 7 | Chromium fluoride | $CrF_3$ | 8 |
| 8 | Manganese fluoride | $MnF_2$ | 9 |
| 9 | Cobaltous fluoride | $CoF_2$ | 10 |
| 10 | Cobaltic fluoride | $CoF_3$ | 11 |
| 11 | Cobalt silicofluoride | $CoSiF_6$ | 12 |
| 12 | Lithium silicofluoride | $Li_2SiF_6$ | 13 |
| 13 | Potassium titanofluoride | $K_2TiF_6$ | 14 |
| 14 | Lithium titanofluoride | $Li_2TiF_6$ | 15 |

Figure 2:
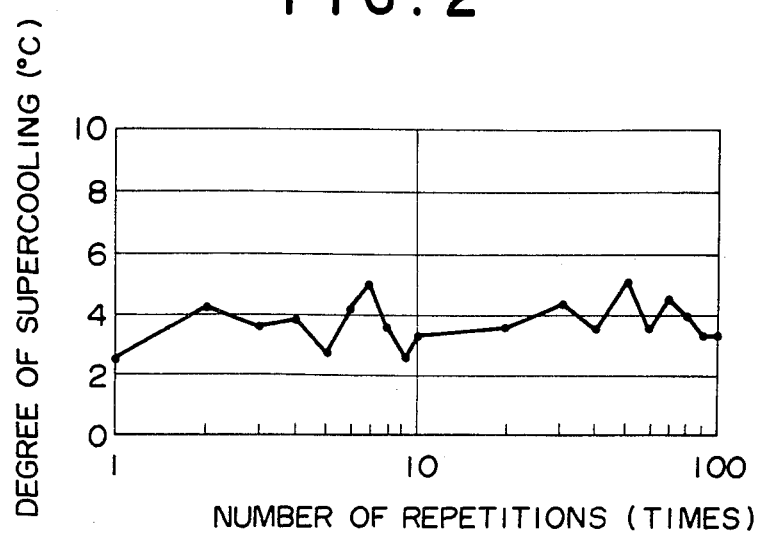
Figure 3:
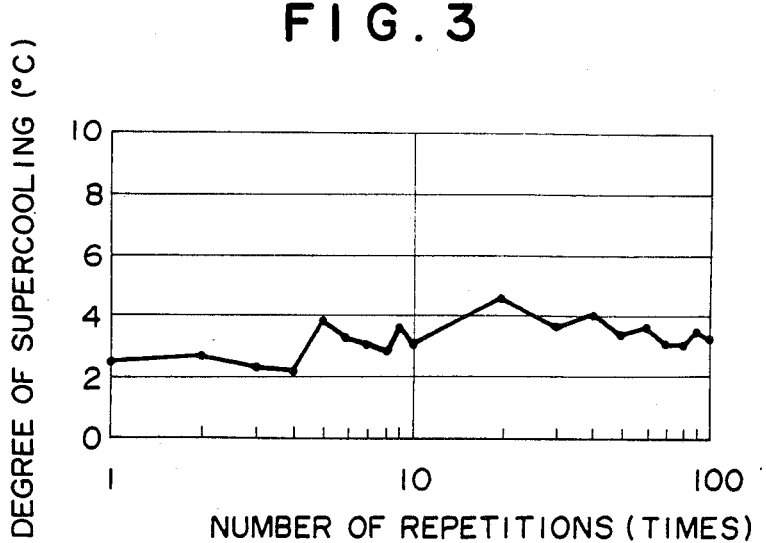
Figure 4:
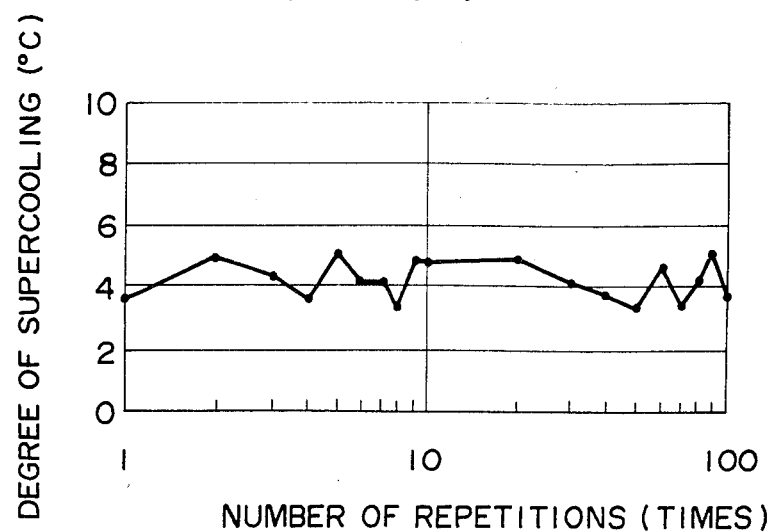
Figure 5:
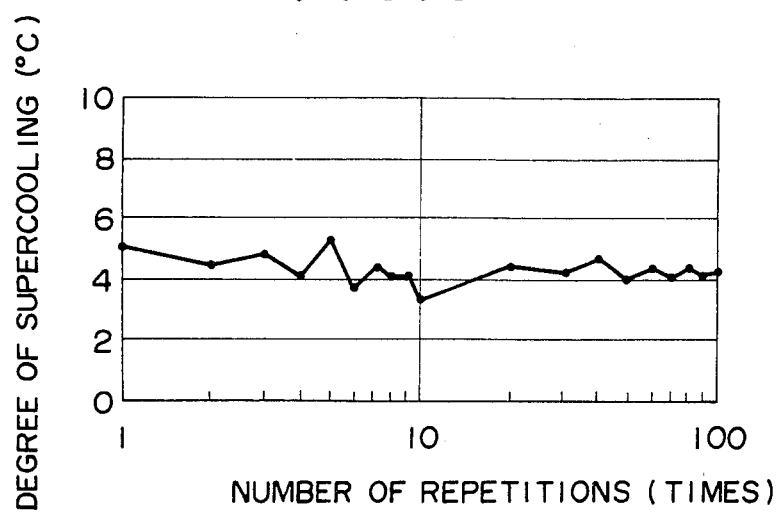
Figure 6:
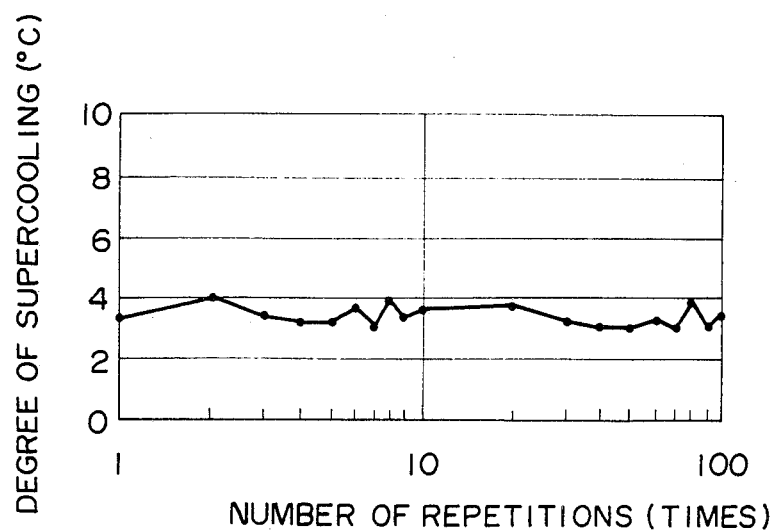
Figure 7:
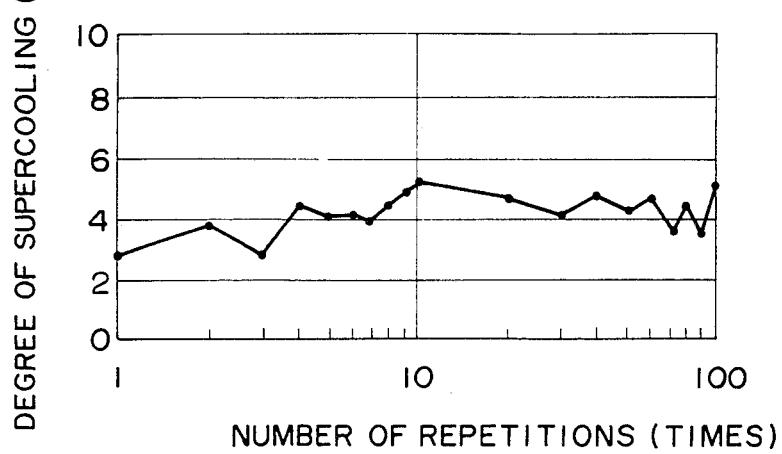
Figure 10:
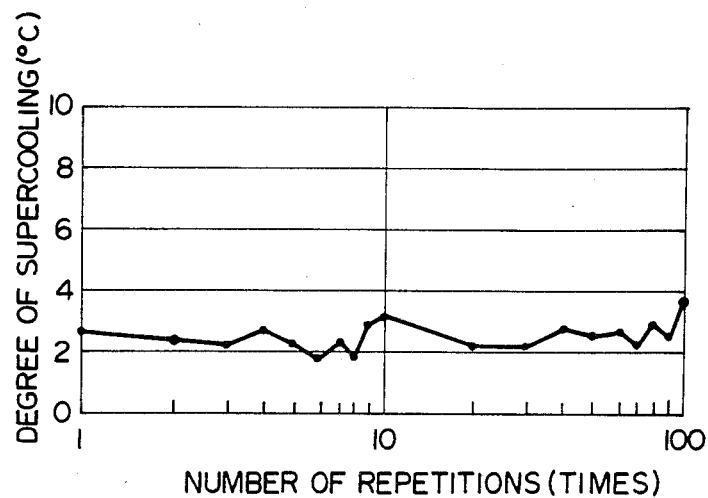
Figure 11:
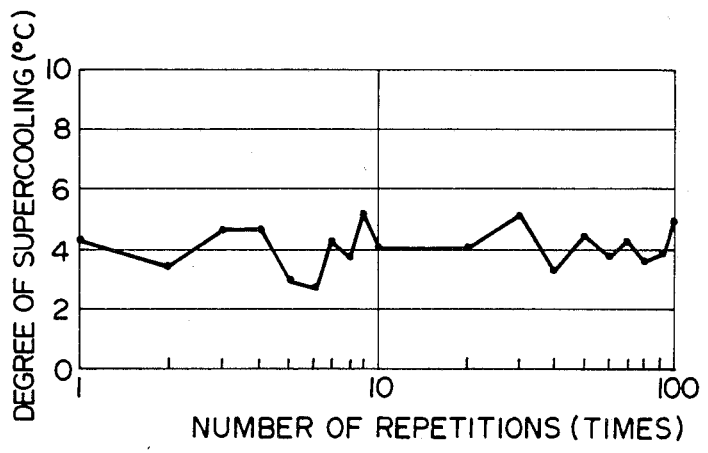
Figure 12:
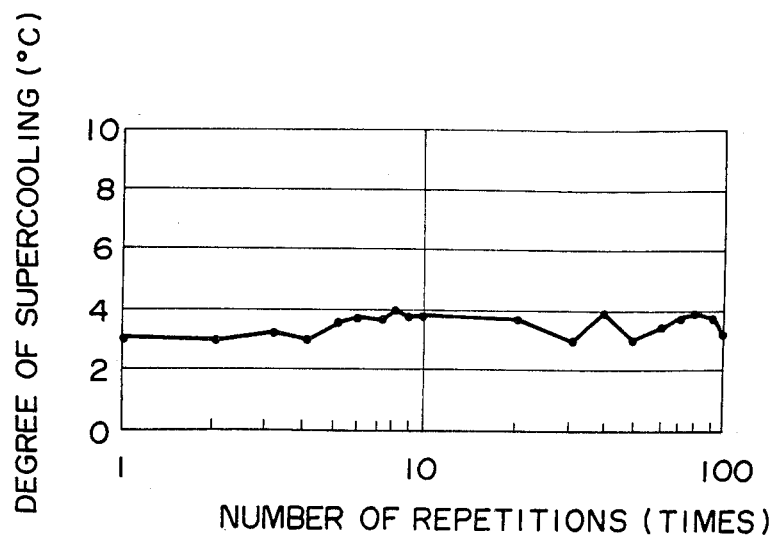
Figure 13:
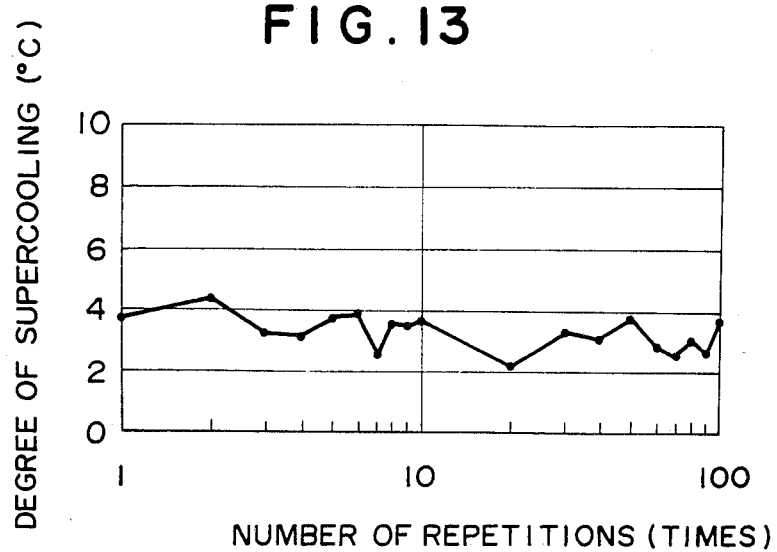
Figure 14:
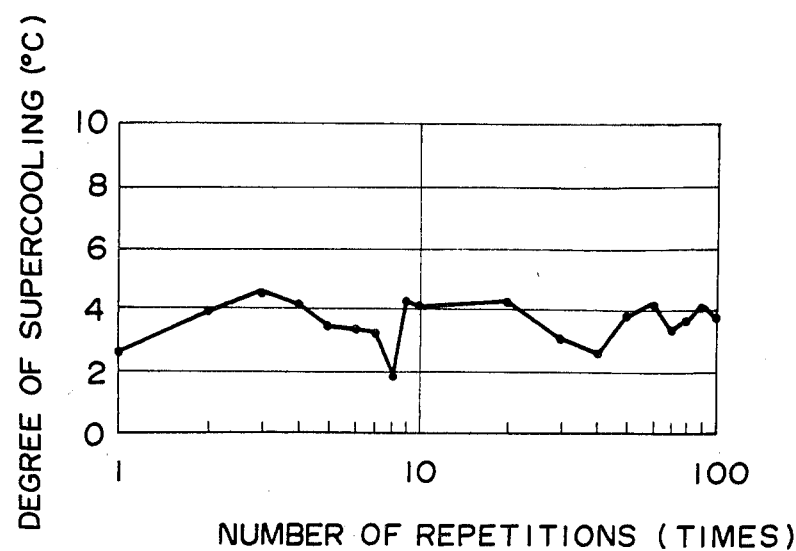
Figure 15:
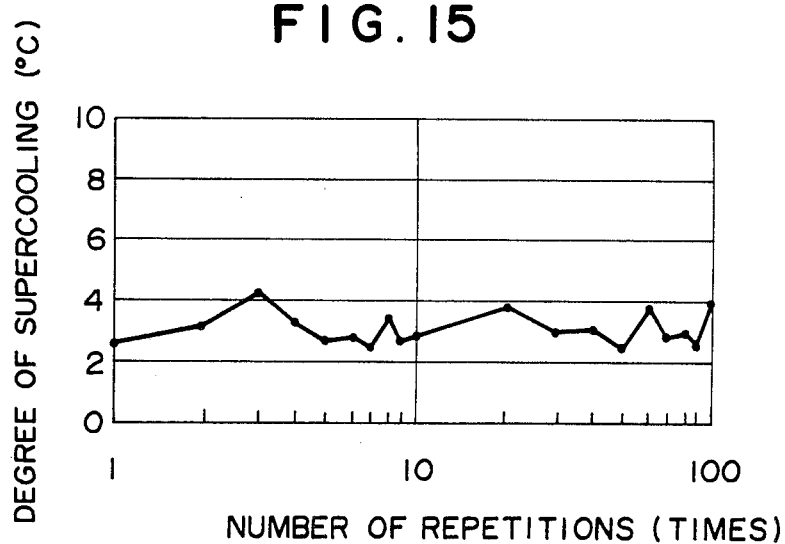

FIG. 2 shows the mode of change of the degree of supercooling, i.e., the difference between the solidifying point (about 58° C.) and a temperature at which supercooling passed away, in the case of 100 continuous repetitions of alternate heating and cooling of a sample using lithium fluoride as a nucleating agent. The axis of abscissa refers to number of repetitions of heating-cooling cycle on longarithmic scales and the axis of ordinate to degree of supercooling (°C.). It can be seen from FIG. 1 that even when alternate heating and cooling of the heat storage material of the present example is repeated 100 times, the degree of supercooling is stably in the range of 3° to 4° C., namely, the supercooling-preventing function is not deteriorated but is effectively fulfiled.

FIGS. 3 to 15 show results obtained for samples using, as a nucleating agent, lithium hydrogen fluoride ($LiHF_2$), sodium fluoride (NaF), sodium hydrogen fluoride ($NaHF_2$), ammonium fluoride ($NH_4F$), strontium fluoride ($SrF_2$), chromium fluoride ($CrF_3$), manganese fluoride ($MnF_2$), cobaltous fluoride ($CoF_2$), cobaltic fluoride ($CoF_3$), cobalt silicofluoride ($CoSiF_6$), lithium silicofluoride ($Li_2SiF_6$), potassium titanofluoride ($K_2TiF_6$) or lithium titanofluoride ($Li_2TiF_6$), respectively. All the samples of these examples show a very stable degree of supercooling of about 3° to 4° C. The latent heat of these samples was measured by means of DSC (differential scanning colorimeter) to be about 60 cal/g in all the cases, and the samples possessed an amount of heat stored which was sufficient for heat storage materials.

EXAMPLE 2

The same samples as in Example 1 were prepared by using each of NaF, $NaHF_2$, $NH_4F$, $SrF_2$, $CrF_3$ and $K_2TiF_6$ as a nucleating agent, and sealed up in a cylindrical container having an inside diameter of 100 mm and a length of 100 mm in the same manner as in Example 1, and alternate heating and cooling were repeated continuously 100 times between 80° C. and 40° C. in a water bath. In this continuous heating and cooling, the samples using any of the nucleating agents solidified stably at a degree of supercooling of about 4° C. as in Example 1. Accordingly, it could be confirmed that the samples using these nucleating agents sufficiently withstood heating to 80° C.

EXAMPLE 3

The same samples as in Example 1 were prepared by using each of LiF, $LiHF_2$, $MnF_2$, $CoF_2$, $CoF_3$, $CoSiF_3$, $Li_2SiF_6$ and $Li_2TiF_6$ as a nucleating agent, and sealed up in a cylindrical container having an inside diameter of 100 mm and a length of 100 mm in the same manner as in Example 1, and alternate heating and cooling were repeated continuously 100 times between 90° C. and 40° C. in a water bath. In this continuous heating and cooling, the samples using any of the nucleating agents solidified stably at a degree of supercooling of about 4° C. as in Example 1. Accordingly, it could be confirmed that the samples using these nucleating agents sufficiently withstood heating to 90° C.

EXAMPLE 4

In a container having a heater in the inside and an inside diameter of 80 cm and a height of 90 cm were placed 500 kg of $CH_3CO_2Na.3H_2O$ and 500 g of each of the nucleating agents shown in Table 1, and the container was sealed up with a plug equipped with a thermocouple-containing tube. By means of the heater inside the container, $CH_3CO_2Na.3H_2O$ was heated to 70° C. to be wholly melted. When the heating by means of the heater was then stopped and cooling was conducted, supercooling passed away at about 55° C., resulting in a rise of temperature inside the container to 58° C., in cases where any of LiF, $LiHF_2$, NaF, $NaHF_2$, $NH_4F$, $SrF_2$, $CrF_3$, $MnF_2$, $CoF_2$, $CoF_3$, $CoSiF_6$, $Li_2SiF_6$, $K_2TiF_6$ and $Li_2TiF_6$ was used as a nuclearing agent. Thereafter, alternate heating and cooling were repeated 50 times to find that in all cases, super-cooling passed away stably at a degree of supercooling of about 3° C. Thus, it could be confirmed that the heat storage materials of the present example fulfiled their function as heat storage materials sufficiently.

EXAMPLE 5

Each of the samples having the formulation as shown in Table 2 was prepared by using commercially available special grade reagent chemicals. The ingredient chemicals in the respective samples were heated together so as to melt $CH_3CO_2Na.3H_2O$ and mixed thoroughly. Then the sample was cooled so as to solidified $CH_3CO_2Na.3H_2O$.

The latent heat of fusion of each of the samples was measured by using a DSC (differential scanning calorimeter), and the latent calories per one gram of each of the samples was calculated. The results of the latent calories of each of the samples were shown in Table 3.

Then 10 g each of the samples was placed in 10 containers respectively, said containers were made of transparent plastic material. Then the containers were sealed. The containers containing each of the samples were heat-treated in a thermostat chamber for 10 hours, then the containers were cooled to 40° C., and observed visually whether the crystallization of $CH_3CO_2Na.3H_2O$ in the container was appeared or not.

The heat resistance temperature of each of the samples is defined as the highest temperature at which all of the 10 samples in the containers showed the crystallization of $CH_3CO_2Na.3H_2O$.

The results of heat resistance temperature are shown in Table 3.

In case that, each of the samples being contained in 10 containers were heated at a temperature higher than the heat resistance temperature thereof, some of the sample in 10 containers were appeared to have been super-cooled and were not solidified. For example, among 10 containers containing Sample No. 3, 6 of the containers were observed as super-cooled.

A sample having the latent calories higher than 40 cal/g, as well as having the heat resistance temperature higher than 85° C. performs that such sample has a large amount of heat-storage capacity and also has higher heat resistance, such sample show excellent performance in storaging the heat, thus such sample can be able to store the heat quickly, and thus it can be utilized widely in practical use as heat storage material.

TABLE 2

| Sample No. | Concentration of $CH_3CO_2Na$ in the system of $CH_3CO_2Na-H_2O$ (% by weight) | Content of LiF in the system of $CH_3CO_2Na-H_2O$ (% by weight) |
|---|---|---|
| 1 | 60.3 | 0.01 |
| 2 | 60.3 | 0.1 |
| 3 | 60.3 | 1.0 |
| 4 | 60.3 | 10.0 |
| 5 | 60.3 | 40.0 |
| 6 | 60.3 | 60.0 |
| 7 | 50.0 | 2.0 |
| 8 | 55.0 | 2.0 |
| 9 | 60.3 | 2.0 |
| 10 | 70.0 | 2.0 |
| 11 | 73.0 | 2.0 |
| 12 | 76.0 | 2.0 |

TABLE 3

| Sample No. | Latent calories (cal/g) | Heat resistance temperature (°C.) |
|---|---|---|
| 1 | 60 | <70 |
| 2 | 60 | 85 |
| 3 | 60 | 93 |
| 4 | 55 | 94 |
| 5 | 43 | 94 |
| 6 | 38 | 93 |
| 7 | 36 | <70 |
| 8 | 45 | 88 |
| 9 | 59 | 93 |
| 10 | 44 | 93 |
| 11 | 40 | 93 |
| 12 | 36 | 93 |

COMPARATIVE EXAMPLE 1

In the same container as in Example 1 was placed 1,000 g of $CH_3CO_2Na.3H_2O$, and heated to 76° C. to be wholly melted. Thereafter, on cooling, $CH_3CO_2Na.3H_2O$ did not crystallize even when the temperature reached room temperature.

COMPARATIVE EXAMPLE 2

In the same container as in Example 2 was placed 500 kg of $CH_3CO_2Na.3H_2O$, and heated to 70° C. by means of a heater inside the container to be wholly melted. When the heating by means of the heater was then stopped and the melt was cooled, $CH_3CO_2Na.3H_2O$ was supercooled to room temperature.

COMPARATIVE EXAMPLE 3

In the same container as in Example 1 were placed 1,000 g of $CH_3CO_2Na.3H_2O$ and 10 g of niobium fluoride ($NbF_5$, $t_m = 75.5°$ C.), and heated to 76° C. to melt the whole $CH_3CO_2Na.3H_2O$. At this time, the niobium fluoride was simultaneously melted. Thereafter, on cooling, $CH_3CO_2Na.3H_2O$ did not crystallize even when the temperature reached room temperature.

COMPARATIVE EXAMPLE 4

In the same container as in Example 1 were placed 1,000 g of $CH_3CO_2Na.3H_2O$ and 10 g of active carbon, and heated to 76° C. to melt the whole $CH_3CO_2Na.3H_2O$. Thereafter, on cooling, $CH_3CO_2Na.3H_2O$ did not crystallize even when the temperature reached room temperature.

EFFECTS OF THE INVENTION

As shown in Examples, the heat storage material of the present invention comprises a $CH_3CO_2Na-H_2O$ system incorporated with a fluorine ion-containing salt which is in solid state at the crystallizing temperature of sodium acetate trihydrate, as a nucleating agent for $CH_3CO_2Na.3H_2O$, and hence it has stable heat absorbing and liberating abilities causing almost no supercooling, has a high heat resistance temperature, is inexpensive, and can store a large amount of heat. Although employment of such a nucleating agent alone is shown in Examples, equal effects can be obtained also by using a plurality of such nucleating agents in combination.

The heat storage material of the present invention is applicable not only to heat storage apparatuses for air conditioning but also to all uses in which heat storage is utilized, for example, regenerative heat-insulating apparatuses.

What is claimed is:

1. A heat storage material characterized by comprising a system consisting of sodium acetate ($CH_3CO_2Na$) and water ($H_2O$) incorporated with a fluorine ion-containing salt which is in solid state at the crystallizing temperature of sodium acetate trihydrate, as a nucleating agent for sodium acetate trihydrate.

2. A heat storage material according to claim 1, characterized in that the system consisting of sodium acetate and water contains 40% to 80% by weight of sodium acetate.

3. A heat storage material according to claim 1, characterized in that the amount of the nucleating agent incorporated is less than 40 parts by weight per 100 parts by weight of the system consisting of sodium acetate and water.

4. A heat storage material according to claim 1, characterized in that the system consisting of sodium acetate and water contains in the range of 55 to 73 percent by weight of sodium acetate, and the fluorine ion-containing compound is lithium fluoride which is contained in the range of 0.1 to 40 parts by weight per 100 parts by weight of the system consisting of sodium acetate and water.

5. A heat storage material according to claim 1, characterized in that the fluorine ion-containing salt which is in solid state at the crystallizing temperaure of sodium acetate trihydrate is at least one member selected from the compound group consisting of lithium fluoride (LiF), lithium hydrogen fluoride ($LiHF_2$), manganese fluoride ($MnF_2$), cobaltous fluoride ($CoF_2$), cobaltic fluoride ($CoF_3$), cobalt silicofluoride ($CoSiF_6$), lithium silicofluoride ($Li_2SiF_6$) and lithium titanofluoride ($Li_2TiF_6$).

6. A heat storage material according to claim 1, characterized in that the fluorine ion-containing salt which is in solid state at the crystallizing temperature of sodium acetate trihydrate is at least one member selected from the compound group consisting of sodium fluoride (NaF), sodium hydrogen fluoride ($NaHF_2$), ammonium fluoride ($NH_4F$), strontium fluoride ($SrF_6$), chromium fluoride ($CrF_3$), and potassium titanofluoride ($K_2TiF_6$).

* * * * *